May 27, 1941.  B. S. AIKMAN  2,243,449
BRAKE CONTROL MEANS
Filed Jan. 31, 1940  2 Sheets-Sheet 1
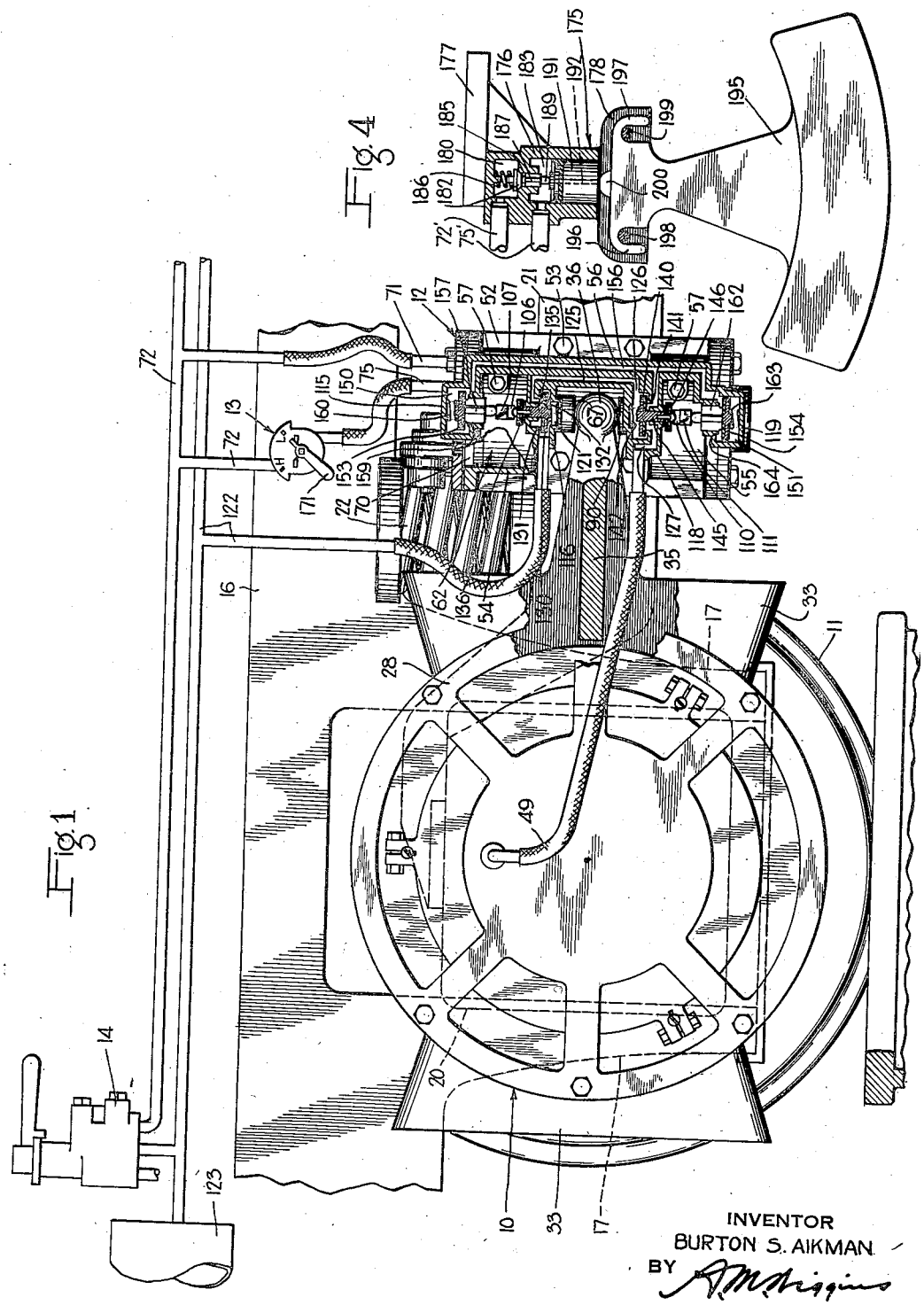
INVENTOR
BURTON S. AIKMAN
BY
ATTORNEY

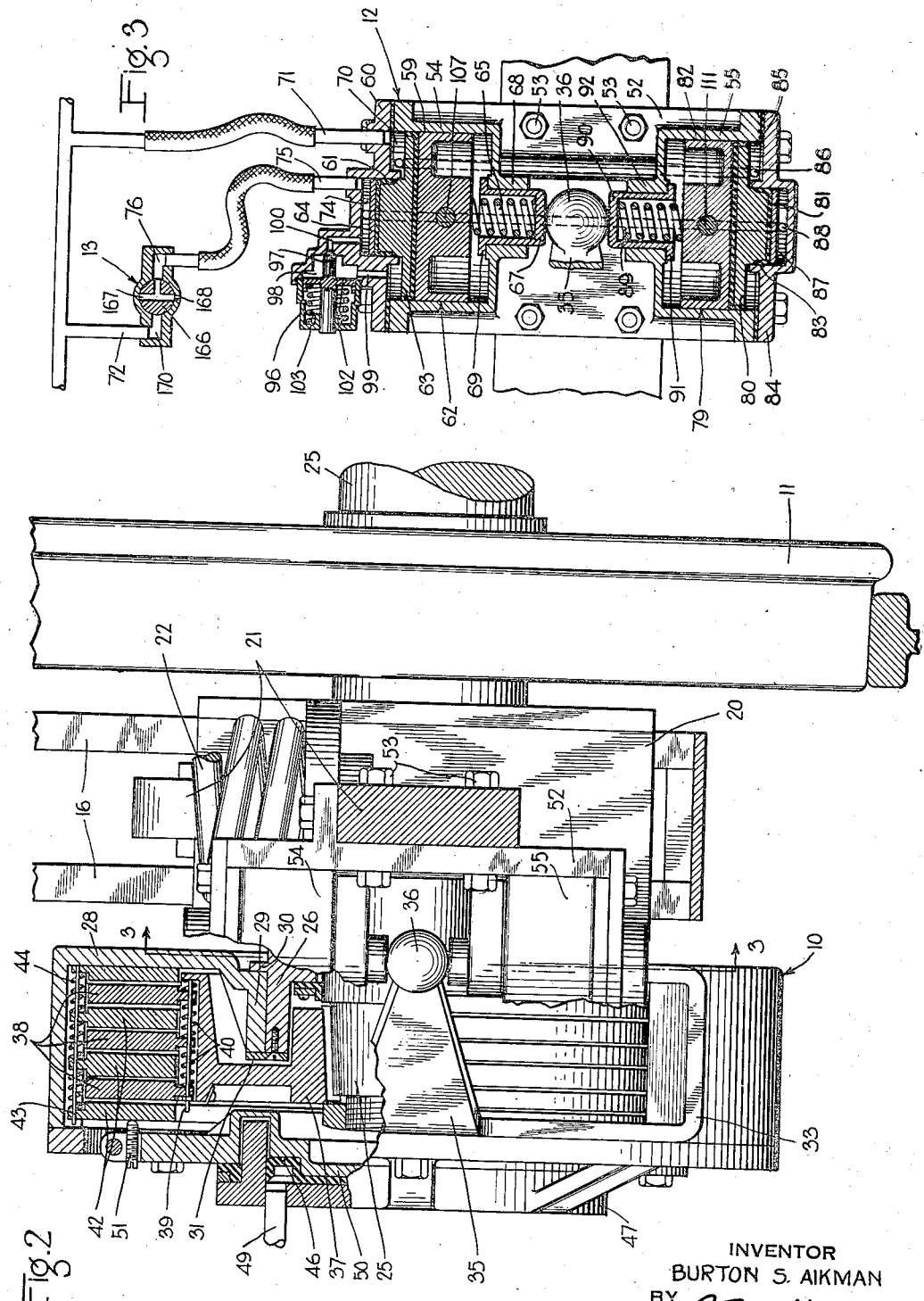

Patented May 27, 1941

2,243,449

UNITED STATES PATENT OFFICE 2,243,449

BRAKE CONTROL MEANS

Burton S. Aikman, Wilkinsburg, Pa., assignor to The Westinghouse Air Brake Company, Wilmerding, Pa., a corporation of Pennsylvania Application January 31, 1940, Serial No. 316,560

14 Claims. (Cl. 303—21)

This invention relates to vehicle brake controlling means, and more particularly to apparatus responsive to braking torque produced by operation of the brakes for regulating the braking force applied to a vehicle wheel.

It has been proposed to provide vehicle brake controlling apparatus operative to regulate an application of the brakes in accordance with the braking torque on a brake element cooperating with a wheel of the vehicle, thereby preventing or greatly minimizing the danger of sliding of the wheel along the rail. One object of my invention is to provide an improved torque responsive brake controlling apparatus in which the operating elements for controlling the brake mechanism for each individual wheel or wheel and axle assembly are pneumatically interlocked with the air brake system.

Under modern service conditions, a car for which the above type of brake control apparatus is adapted may be employed at one time in a train of the high speed type, in which the air brake system is usually designed for a high braking ratio, i. e., the relation of braking force to car weight, and may at another time be used in a train in so-called "regular" service having a brake system operative under a relatively low braking ratio condition. It is, therefore, another object of my invention to provide a torque controlled braking apparatus including means for adjusting the torque measuring mechanism to render the braking equipment operable either in high speed service or "regular" service.

Still another object of the invention is to provide a brake controlling equipment of the above type in which maximum braking force is always created during an emergency application of the brakes regardless of the service in which the vehicle is operated.

Other objects and advantages of the invention will be apparent in the following more detailed description thereof, taken in conjunction with the accompanying drawings, wherein Fig. 1 is a fragmentary elevational view, partly in section, showing one wheel and the associated brake mechanism of a railway truck embodying a preferred form of the invention;

Fig. 2 is an end view, partly in section, of the vehicle wheel and the brake mechanism shown in Fig. 1;

Fig. 3 is an enlarged detail sectional view taken substantially along the line 3—3 of Fig. 2; and Fig. 4 is a diagrammatic sectional view of an automatic changeover valve device which may be substituted for the manually operable valve device shown in Fig. 1.

Referring to Fig. 1 of the drawings, the equipment illustrated includes a disk brake mechanism 10 operable to apply braking force to a wheel 11, a torque actuated control valve device 12, a changeover valve device 13, and a self-lapping brake valve device 14.

The brake mechanism 10 is similar to that shown and described in my application for patent for a brake mechanism filed in the United States Patent Office April 14, 1938, Serial No. 201,866, and is shown in Figs. 1 and 2 in association with a vehicle truck that is illustrated in fragmentary form as comprising a side frame structure 16 having the usual pedestal jaw members 17 between which is slidably guided a journal structure 20. Elements of the vehicle truck shown in the drawings further include an equalizer member 21, which is supported on the journal structure 20 and carries the side frame structure 16 through the medium of truck springs, such as that indicated at 22. As is best shown in Fig. 2, the wheel 11 is secured to an axle 25, the outer end of which extends beyond the journal structure 20. Surrounding a portion of the axle 25 is an annular member 26, which is secured to the journal box structure 20 by suitable means, not shown, and which has slidably mounted thereon a housing 28. The housing has a flange portion 29 which is held in sliding engagement with the member 26 between an annular collar 30 formed thereon and a ring member 31 that is bolted to the flange portion. The housing 28 is provided with oppositely disposed ventilating ducts 33, and carries a projecting torque arm 35 having a rounded end portion 36, which is operatively associated with the torque actuated control valve device 12 hereinafter described.

Disclosed within the housing 28 and keyed or otherwise secured to the outer end of the axle 25 is a rotor 37 carrying a plurality of annular braking plates or friction disks 38, which are respectively secured to the rotor by means of a plurality of rods 39 and are adapted to be held apart by means of springs 40. The friction disks 38 are arranged in interleaved relation with a plurality of stationary brake disks 42, which are slidably mounted on a plurality of rods 43 carried by the housing 38 and are normally held out of engagement with the adjacent friction disks 38 by means of springs such as 44.

The several rotatable friction disks 38 and stationary friction disks 42 are adapted to be pressed together for creating braking force on the associated wheel and axle assemblies by operation of a flexible diaphragm 46, which is mounted in a portion 47 of the housing structure and is subject to the pressure of fluid supplied through a supply pipe 49. The diaphragm 46 is engaged at the side thereof opposite that exposed to fluid pressure by a follower plate 50 which carries a plurality of adjustable elements 51 engaging the outermost stationary friction disks 42.

As shown in Fig. 1 of the drawings, the torque actuated brake control valve device 12 comprises a casing structure including a bracket portion 52 secured by means of bolts 53 to the equalizer member 21, a pair of vertically spaced cylinder portions 54 and 55 carried by the bracket portion, and a valve casing portion 56 which may be secured to the respective cylinder portions by means of bolts 57.

Referring to Fig. 3, which is an enlarged detail sectional view of the cylinder portions 54 and 55 of the control valve device, the cylinder portion 54 has formed therein a bore 59 the upper end of which is closed by a cover member 60 within which is formed a bore 61 having a smaller diameter than that of the bore 59 and disposed concentrically thereof. Operatively mounted within the cylinder portion 54 is a piston assembly 62 having a large face 63 formed on a portion which is disposed within the bore 59 and a small face 64 formed on a portion disposed in the smaller bore 61. The piston assembly 62 is urged upwardly toward the normal position as shown in Fig. 3 under the force of a coil spring 65, which is interposed between the piston assembly and a movable abutment 67 slidably mounted in a sleeve portion 68 of the cylinder portion 54 and projecting outwardly thereof. The abutment 67 has a collar 69 formed on the upper end thereof for limiting downward movement of the member. The larger piston face 63 is subject to the pressure of fluid in a chamber 70 communicating with a pipe 71, which, as shown in Fig. 1, is connected by way of a train pipe 72 to the supply port of the self-lapping brake valve device 14. The smaller piston face 64 is subject to the pressure of fluid in a chamber 74 communicating by way of a pipe 75 with a port 76 of the changeover valve device 13 hereinafter described.

The elements mounted in the cylinder portion 55 of the casing are similar to those just described and comprise a piston assembly 79 having a large face 80 and a small face 81. The large and small portions of the piston assembly 79 are slidably mounted in bores 82 and 83 respectively formed in the cylinder portion and in a cover member 84 carried thereby. The piston face 80 is subject to the pressure of fluid in a chamber 85 which communicates by way of a passage 86 formed in the bracket 42 with the piston chamber 70. Formed at the pressure face 81 of the piston assembly is a chamber 87 which communicates by way of a passage 88 with the piston chamber 84. The piston assembly 79 is urged downwardly in opposition to any fluid pressure in the piston chambers under the force of a coil spring 89, which is interposed between the piston assembly and a movable abutment 90. The abutment 90 is slidably mounted in a bore 92 in alignment with the abutment 67, and is provided with a shoulder 91 for limiting outward movement thereof with respect to the cylinder portion 55.

An equalizing valve device 96 is carried by the cover memer 60 of cylinder portion 54, and comprises a valve element 97 disposed in a valve chamber 98 and operative for controlling communication from the connected piston chambers 70 and 85 by way of a passage 99, the valve chamber and a passage 100 to the connected piston chambers 74 and 87. The valve element 97 is operable by a piston 102 which is subject to the opposing pressures of fluid in valve chamber 98 and of a spring 103. As shown in Fig. 1, the cylinder portion 54 has formed therein a vertically disposed slot 106 through which projects a lug 107 that is suitably secured to the piston assembly 63 mounted within the cylinder portion, it being understood that the slot 106 is disposed beyond the range of movement of the piston assembly so that escape of fluid under pressure from the piston chamber 70 is prevented. Similarly, the cylinder portion 55 of the casing structure is provided with a vertical slot 110 through which extends a lug 111 which is secured to the piston structure within that cylinder portion.

The valve casing section 56 has formed thereon a pair of extensions 115 and 116 which are respectively disposed above and below the projecting lug 107, and a similar pair of extensions 118 and 119 which are arranged on opposite sides of the lug 111. Formed within the extension 116 is a valve chamber 121 which communicates by way of a supply pipe 122 with a normally charged reservoir 123, and which is also connected by way of a passage 125 with a valve chamber 126 formed within the extension 118 and communicating through a passage 127 with the pipe 49 leading to the pressure chamber of disk brake mechanism 10.

Disposed in the valve chamber 121 is a supply valve element 130 which is normally held in engagement with a seat rib 131 under the force of a coil spring 132 for closing the communication between the chamber 121 and the passage 125, as shown in Fig. 1. The valve element 130 has a stem 135 that is slidably mounted in a suitable bore in the casing and terminates in a sealing portion 136, which is disposed in operative alignment with the movable lug 107. Mounted in the valve chamber 126 is a valve 140 which is normally held in engagement with a seat rib 141 under the force of a coil spring 142 for cutting off communication between the valve chamber 126 and the passage 127. The valve element 140 has a stem 145 which is slidably mounted in a suitable bore formed in the extension 118 and terminates in a sealing portion 146, which is disposed in operative alignment with the movable lug 111. It will be apparent that the valve elements 130 and 140 are so arranged that while either of the valves is seated communication from the supply pipe 122 to the disk brake pipe 49 is closed.

Formed in the casing extensions 115 and 119 are valve chambers 150 and 151, within which are mounted release valve elements 153 and 154, respectively. The valve chambers 150 and 151 are connected together by a passage 156, which in turn communicates by way of the passage 127 and conduit 49 with the pressure chamber of the brake mechanism 10. The valve element 153 has a fluted stem 157 slidably mounted in a bore leading from the valve chamber 150 to the atmosphere, and is engageable with the upper surface of the movable lug 107, which as shown in Fig. 1 is normally positioned for maintaining the valve element 153 spaced away from its seat 159 against the force of a coil spring 160. The valve element 154 likewise has a fluted stem 162 slidably mounted in a bore connecting the valve chamber 151 to the atmosphere, the outer end of which stem is adapted for engagement with the lower surface of the movable lug 111. A coil spring 163 is interposed between the valve element 154 and the lower wall of the chamber 151 for urging the valve element toward a seat rib 164, it being understood that the movable lug 111 is normally adapted to hold the valve element in unseated position as shown in the drawings.

Referring to Fig. 3 of the drawings, the change-over valve device 13 comprises a casing having a bore in which is mounted a rotary valve key 166 having a branched passageway 167 which, with the valve key in the position illustrated, is adapted to establish communication from the passage 76 to a restricted atmospheric exhaust port 168 formed in the casing of the valve device. As hereinafter explained, the valve key 166 is in this position adapted to condition the brake control apparatus for operation in a train equipped for "regular" service with brakes designed for a low braking ratio. When the valve key 166 of the changeover valve device is moved in a counter-clockwise direction to its other position, communication is established from the passage 76 through the passageway 77 to a passage 170 leading to the supply pipe 72, the brake control apparatus being then conditioned for operation in high speed, high braking ratio service. As shown in Fig. 1, a handle 171 may be provided for operating the changeover valve device 13.

It may be desired to employ automatic changeover valve means in place of the manually operated valve device 13 shown in Figs. 1 and 3. Referring to Fig. 4 of the drawings, there is illustrated an inertia controlled changeover valve device 175, comprising a casing 176 having a bracket portion 177 which is adapted to be secured by suitable means, not shown, to the frame of the vehicle truck, and a carrier portion 178 which is adapted to be disposed longitudinally of the truck. The casing 176 has formed therein a valve chamber 180 communicating by way of a pipe 72' with the supply port of the usual brake valve device such as that shown in Fig. 1, in which chamber is mounted a valve element 182 operative to control communication between the chamber 180 and a chamber 183. The latter chamber is connected by way of a pipe 75' to the small piston chambers 74 and 87 as will be understood by reference to Fig. 3. The valve element 182 is normally urged into engagement with a seat 185 under the force of a coil spring 186 disposed in the chamber 180.

A fluted stem 187 carried by the valve element 182 is slidably mounted in the bore connecting chambers 180 and 183, and terminates in a valve portion 189 which is adapted to seat on the upper surface of a plunger element 191 slidably mounted within the chamber 183. The plunger 191 has a passage 192 for connecting the chamber 183 to the atmosphere, which passage is adapted to be closed upon upward movement of the plunger into engagement with the valve portion 189. For controlling movement on the plunger 191 there is provided an inertia member 195, the upper end of which has formed thereon a pair of spaced arm portions 196 and 197 adapted to rest on pins 198 and 199 projecting from the carrier portion 178 of the changeover valve casing. The arms 197 and 196 thus extend longitudinally of the vehicle truck or parallel to the path of movement thereof. A boss portion 200 is formed on the inertia member 195 intermediate the arm portions 196 and 197 for normally supporting the plunger 191 in its lower position as shown in Fig. 4. As hereinafter explained, the inertia member 195 is designed to swing out of the normal position illustrated in response to an application of the brakes only when the vehicle is operated in a train in high speed service, i. e., in a train the other cars of which are equipped with brakes of the high braking ratio type.

*Operation*

The brake control equipment is illustrated in the drawings as conditioned for operation in "regular" service employing brake equipment of the low braking ratio type, it being observed in Fig. 3 that the valve key 166 in the changeover valve device 13 is positioned to connect the passage 76 through the passageway 167 to the restricted atmospheric port 168, so that the connected chambers 74 and 87 of the control valve device 12 are vented.

If it is desired to effect a service application of the brakes, the brake valve device 14 shown in Fig. 1 is moved to a suitable position in the service application zone for supplying fluid from the main reservoir 123 to the pipe 72 at a pressure determined in accordance with the force with which the brakes are to be applied. As may be seen in Fig. 3, fluid under pressure supplied to the pipe 72 flows therefrom by way of the branch pipe 71 to chamber 70 in the control valve device 12, and thence by way of the passage 86 to the chamber 85.

At the same time, fluid under pressure flows from the chamber 70 through the passage 99 to the piston chamber 98 of the equalizing valve device 96, but since the pressure of fluid is at this time less than that required to effect an emergency application of the brakes, the spring 103 remains effective through the medium of the piston 102 to hold the valve 97 seated.

Upon the increase of fluid pressure in the chambers 70 and 85, acting on the large pressure faces 63 and 80 of the respective piston assemblies 62 and 79, the piston assemblies are forced inwardly against the opposing forces of the springs 65 and 89, respectively, and into engagement with abutments 67 and 90. As the piston assemblies mounted in the cylinder portions 54 and 55 are thus operated, the movable lugs 107 and 111 carried thereby as shown in Fig. 1 are thus moved toward each other and away from the respective valve stems 157 and 162. The release valve elements 153 and 154 are then quickly moved into engagement with the respective seat ribs 159 and 164 under the pressures of springs 160 and 163, thus cutting off communication from the passage 156 to the atmosphere. Continued movement of the lugs 107 and 111 as just explained results in operative engagement of the lugs with the adjacent ends of the valve stem 135 and 145, respectively, and the two supply valve elements 130 and 140 are then moved to their unseated positions. With the supply valve elements 130 and 140 thus unseated, fluid under pressure is supplied from the main reservoir 123 by way of the pipe 122, valve chamber 121, passage 125, valve chamber 126, passage 127 and pipe 49 to the diaphragm chamber of the disk brake mechanism 10, so that the diaphragm 46 shown in Fig. 2 is operated in the usual manner to cause frictional engagement of the several spring disks 42 and 38.

Assuming that the application of the brakes is thus effected while the wheel 11 is rotating in a counterclockwise direction as viewed in Fig. 1 of the drawings, it will be apparent that the casing 28 and torque arm portion 35 thereof will be subjected to braking torque tending to carry the torque arm portion upwardly, so that the rounded end portion 36 thereof is forced upwardly against the movable abutment 67. Referring to Fig. 3, as the torque arm 35 is thus moved upwardly, it shifts the movable abutment 67 and the piston 63 in the same direction in opposition to the pressure of fluid in chamber 70. When the force due to braking torque transmitted to the piston assembly 62 becomes greater than the pressure of fluid in the chamber 70 acting against the piston face 63, the piston assembly 62 is moved upwardly, while the lug 107 carried thereby, see Fig. 1, is operated to permit movement of the valve element 130 into engagement with the seat rib 131 under the force exerted by the spring 132.

With the supply valve 130 in seated position, communication between the valve chamber 131 and the passage 125 is closed so that the supply of fluid under pressure to the diaphragm chamber of the disk brake mechanism 10 is cut off. Since the force of which the brakes are applied is thus limited, in accordance with the predetermined fluid pressure in the pipe 72 and in the piston chambers of the control valve device 12, as just explained, further movement of the torque arm 35 is checked before the movable lug 107 and the associated piston assembly have been shifted far enough to effect unseating of the release valve element 153. The control valve device 12 is thus held in lap position with all valve elements thereof seated, so that the disk brake mechanism 10 is maintained in application position for subjecting the wheel 11 to a braking force proportional to the predetermined fluid pressure in pipe 72.

As the vehicle speed diminishes under the effect of the service application of the brakes as just explained, the braking effect produced by the brake mechanism 10 may become greater due to gradually increased coefficient of friction between the several brake disks therein, with the result that the torque arm 35 is subjected to correspondingly increased braking torque. The rounded end portion 36 of the torque arm is thereby again forced upwardly against the movable abutment 67 and the associated piston assembly 62 within the cylinder portion 54, until the piston assembly lug 107 carried thereby is further displaced. As the lug 107 is thus shifted toward its uppermost position, it acts through the medium of the valve stem 157 to raise the release valve element 153 away from the seat rib 159, whereupon fluid under pressure is vented from the diaphragm chamber of the disk brake mechanism 10 by way of the pipe 49, passage 127, passage 156, and through the valve chamber 150 and past the fluted valve stem 157 to atmosphere. A quick partial release of the brakes is thereby initiated to avoid or minimize the danger of any possible sliding of the wheel 11.

As the pressure of fluid in the diaphragm chamber of the brake mechanism 10 is thus reduced for effecting a partial release of the brakes, the braking torque on the torque arm 35 is correspondingly lessened until the effect of that force on the brake controlling valve device 12 substantially balances the effect thereon of fluid pressure in pipe 72. The brake controlling valve device 12 is then operated to lap position for maintaining the brakes applied under reduced force. It will be understood that this operation of the brake apparatus to effect a partial release of the brakes may be repeated intermittently during the time required to bring the vehicle to a stop.

The fluctuating values of the coefficient of friction between the brake disks cannot be predicted with certainty, and under some operating conditions the coefficient may decrease with the vehicle speed. In such a case, following an automatic release of fluid under pressure from the diaphragm chamber of brake mechanism 10 as already explained, the brake control apparatus is adapted to effect a reapplication of the brakes, assuming that the vehicle has not yet been brought to a stop. When the torque arm 35 is relieved of braking torque due to release of the brakes, the pressure of fluid acting against the piston assembly 62 of the brake controlling valve device 12 once again becomes effective to move the piston downwardly, thereby operating the lug 107 into operative engagement with the stem 135 for unseating the valve element 130, whereupon fluid under pressure is again supplied in the usual manner from the pipe 122 through the valve chamber 121, passage 125, valve chamber 126 and pipe 49 to the diaphragm chamber of the brake mechanism 10. The brake mechanism is thereby operated to reapply braking force to the wheel 11 in the usual manner.

When it is desired to effect the release of the brakes, the brake valve device 14 is operated to vent fluid under pressure from the pipe 72 and consequently from the piston chamber 70 of the brake controlling valve device 12. As is best shown in Fig. 3, upon reduction of the fluid pressure in the piston chamber 70, the spring 65 is rendered effective to shift the piston assembly 62 upwardly to the normal position, and the lug 107, shown in Fig. 1, is thereby drawn into operative engagement with the stem 157 of the valve 153, which is unseated against the force of the spring 160 to vent fluid under pressure from the diaphragm chamber of the brake mechanism 10 to the atmosphere by way of communications already traced. At the same time, the piston assembly contained in the similar cylinder portion 55 of the brake controlling valve device 12 is rendered operative in a like manner to effect unseating of the release valve element 154. The various operating elements of the brake control apparatus are then disposed in the release position as shown in Fig. 1 of the drawings.

It will readily be understood that if the vehicle is being operated to cause rotation of the wheel 11 in a clockwise direction when an application of the brakes is initiated, the torque arm 35 is in that case shifted downwardly due to braking torque, causing the automatic control of the brake application to be effected through the medium of the piston assembly contained within the lower cylinder portion 55 of the control valve device and the associated supply valve element 140 and release valve element 154. Operation of these elements will be understood from the explanation already given.

Let it now be assumed that the vehicle equipped with my improved brake control apparatus is to be operated in a train in high speed service, wherein the majority of cars in the train are provided with fluid pressure brakes of the high braking ratio type. In order to condition the apparatus shown in the drawings for operation in high speed service, the changeover valve device 13 is first moved to the corresponding position, wherein the valve key 166 shown in Fig. 3 is so disposed that the passageway 167 thereof establishes communication from the passage 170 to the passage 76, while the atmospheric exhaust port 168 is isolated. Upon operation of the brake valve device to effect supply of fluid under pressure to the pipe 72 for causing application of the brakes, fluid under pressure flows therefrom by way of the pipe 71 to the piston chambers 70 and 85 adjacent the large piston faces 63 and 80, and also is supplied by way of the connected passages 170, 167 and 76 of the changeover valve device and through pipe 75 to the piston chambers 74 and 87 at the small pressure faces of the respective piston assemblies.

The piston assembly 62 is thus forced against the movable abutment 67 under a loading force corresponding to the pressure of fluid acting against the combined pressure areas of piston faces 63 and 64, while the piston assembly 79 and movable abutment 90 are similarly loaded under pressure of fluid acting on the piston faces 80 and 81. It will be understood that the movable lugs 107 and 111 are at the same time operated in the manner hereinbefore explained to permit the release valve elements 153 and 154 to assume their seated positions, and to effect unseating of the respective supply valve elements 130 and 140, so that fluid under pressure is supplied from the pipe 122 past the supply valve and through the pipe 49 to the diaphragm chamber of the brake mechanism 10.

When the torque arm 35 is displaced under the effect of the resultant braking torque, such movement of the torque arm and of the associated valve elements of the control valve device 12 is this time resisted by either the movable abutment 67 and piston assembly 62 or the movable abutment 90 and piston assembly 79, according to the direction in which the vehicle is traveling, with a force greater than that exerted when the control valve device is conditioned for "regular" train service. The additional force with which the movement of the torque arm 35 is thus resisted is of course determined by the relation of the pressure area of the effective smaller piston face to that of the larger piston face within the brake controlling valve device 12. The brake controlling valve device 12 is thus operated to continue the supply of fluid under pressure to the disk brake mechanism 10 until the braking force applied to the wheel, in response to the predetermined increase in fluid pressure in pipe 72, is greater than that resulting during application of the brakes in "regular" service, after which the corresponding greater braking torque becomes effective through the medium of the torque arm 35 to effect operation of the brake controlling valve device 12 to lap position in the manner already explained. It will thus be apparent that, with the changeover valve device 13 set for high braking ratio service, the brake controlling valve device 12 is rendered operative in accordance with variations in fluid pressure in the pipe 72 to effect operation of the associated brake mechanism corresponding with the operation of the high speed braking system with which other vehicles of the train are equipped.

The equalizing valve device 96, which is best illustrated in Fig. 3 of the drawings, is provided to render the brake controlling valve device 12 operable to effect an emergency application of the brakes with maximum braking force while the vehicle is operated in "regular" service, with the changeover valve device 13 positioned as shown in the drawings for maintaining communication from the connected chambers 74 and 70 to the atmosphere by way of the restricted port 68. If it is desired to effect an emergency application of the brakes, the brake valve device 14 shown in Fig. 1 is operated to supply fluid under a maximum pressure to the pipe 72 and thence to the connected chambers 70 and 85 of the brake controlling valve device 12, the operating elements and valve members of which are then actuated as hereinbefore explained to initiate supply of fluid under pressure to the disk brake mechanism. At the same time, however, fluid at maximum pressure flows from the chamber 70 through passage 99 to the valve chamber 98 and acts against the piston 102 in opposition to the force of the spring 103 to unseat the valve 97, thus causing flow of fluid by way of passage 100 to the connected chambers 74 and 87. With the combined pressure areas of the piston assembly 62 and of the similar piston assembly 79 thus subjected to fluid pressure, the springs 65 and 89 are compressed and the abutments 67 and 90 are then loaded to a substantially maximum degree, and are consequently adapted to resist displacement of the torque arm 35 for preventing the stopping of the supply of fluid under pressure to the brake mechanism until an emergency braking force has been developed.

*Apparatus shown in Fig. 4*

My improved brake control equipment may be arranged for completely automatic operation by substituting the automatic changeover valve device 175 shown in Fig. 4 in place of the manually controlled changeover valve device 13 shown in Fig. 3. It will be readily understood that, with the chamber 180 of the valve device 175 connected through pipe 72' with the pipe 72 shown in Fig. 3, and with the chamber 183 of the valve device connected by way of pipe 75' with the piston chamber 74 of the control valve device 12 shown in Fig. 3, the valve element 182 of the changeover valve device 175 will be operable to control supply of fluid under pressure to the connected small piston chambers 74 and 87, while the valve portion 189 of the stem 187 is cooperative with the seat 185 to control venting of said piston chamber to the atmosphere by way of passage 192.

If an application of the brakes is effected while the vehicle equipped with automatic changeover valve device 175 is operated in "regular" service, the valve 182 is maintained in engagement with the seat 185 by the force of the spring 186 for preventing flow of fluid under pressure to the smaller piston chambers 74 and 87 of the control valve device 12, for the duration of the brake application, since the inertia member 195 is constructed and arranged to prevent appreciable movement thereof out of the normal position shown in Fig. 4 under the retardation effect normally produced by an application of the brakes on a train equipped for "regular" service. The smaller piston chambers 74 and 87 of the brake control valve device 12 are thereby connected to the atmosphere, while the larger piston chambers 70 and 85 are supplied with fluid under pressure from the pipe 72 for initiating and controlling an application of the brakes under a predetermined braking force corresponding to the degree of brake application produced throughout the train.

If the vehicle carrying my improved torque controlled braking system is operated in high speed service, however, and the other vehicles of the train are provided with high speed brake equipment of the high braking ratio type, the automatic changeover valve device 175 will be rendered operative in response to an application of the brakes to condition the associated brake control valve device 12 to permit build up of maximum braking force. During the first stage of an application of the brakes in high speed service the torque controlled brake apparatus including the automatic changeover valve device 175 is operative in the manner just explained for initiating operation of the associated disk brake mechanism, but the inertia member 195 is constructed and arranged to respond quickly to the effect of train deceleration at the relatively high rate obtained in high speed braking service, by tilting about either the pin 198 or the pin 199, depending upon the direction in which the vehicle is traveling. The boss portion 200 of the inertia member is thereby lifted upwardly for moving the plunger member 191 into operative engagement with the valve stem 187, closing the passage 192 and unseating the valve 182 against the pressure of the spring 186, whereupon fluid under pressure is supplied from the pipe 72' by way of the chambers 180 and 183 and pipe 75' to the piston chambers 74 and 87 of the brake controlling valve device 12 shown in Fig. 3. When the combined pressure faces of the piston assemblies 62 and 79 thus subjected to fluid under pressure supplied from the pipe 72, the brake controlling valve device 12 is conditioned for controlling the application of the brakes within the high speed braking range.

It will be apparent from the foregoing description that the fluid pressure brake equipment constructed in accordance with my invention may be conditioned either for operation in a high speed train for which a high braking ratio is desired, or for operation in so-called "regular" service, for which braking equipment of a relatively low braking ratio type is ordinarily employed. My improved brake apparatus may be conditioned for either class of service by manually operative changeover means, or by operation of an automatically controlled changeover mechanism, as desired.

Although a preferred embodiment and a modification of certain elements thereof have been described in detail, it is not intended to limit the invention thereto or otherwise than by the terms of the appended claims.

Having now described my invention, what I claim as new and desire to secure by Letters Patent, is:

1. A torque controlled braking apparatus for a vehicle comprising braking means, a control device therefor including brake controlling means and means subject to the opposing forces of a variable fluid pressure and of braking torque for actuating said brake controlling means to maintain a retarding force that is proportional to said fluid pressure, and changeover means operable to condition said control device for high braking ratio service at one time and for low braking ratio service at another time.

2. A torque controlled brake apparatus for a vehicle comprising braking means, a control device therefor including brake controlling means and means subject to the opposing forces of a variable fluid pressure and of braking torque for actuating said brake controlling means to produce a retarding force which is maintained proportional to said fluid pressure, and changeover means adjustable to condition said control device for controlling said braking means according to one ratio of said opposing forces at one time, and according to a different ratio of said forces at another time.

3. A torque controlled brake apparatus for a vehicle comprising braking means, a brake control device operative to determine the degree of application of the brakes and including movable abutment means subject to the opposing forces of a variable fluid pressure and of braking torque produced by said braking means, and changeover means operable to vary the amount of the area of said movable abutment subject to said fluid pressure, in accordance with the type of railway service in which the vehicle is operated.

4. A torque controlled brake apparatus for a vehicle comprising braking means, a brake control mechanism therefor including movable abutment means subject to the braking torque force produced by said braking means and having inner and outer pressure areas subject to a variable fluid pressure opposing said braking torque force, and changeover means having one position for preventing application of said fluid pressure to one of said pressure areas and another position for establishing a fluid pressure on said one area equaling that acting on the other pressure area of said movable abutment means.

5. A torque controlled brake apparatus for a vehicle comprising fluid pressure operated brake means, valve means controlling supply and release of fluid under pressure to and from said brake means, spring means, movable abutment means having a plurality of pressure surfaces and normally positioned by said spring means for maintaining said valve means in brake release position, a torque member operative in response to braking torque to displace said abutment means for moving said valve means to fluid supplying position, means for establishing a control fluid pressure acting on said abutment means in opposition to braking torque and variable in accordance with the desired degree of application of the brakes, and changeover valve means operable for isolating one of said pressure surfaces of the abutment means from said control fluid pressure.

6. A vehicle brake system comprising, in combination, fluid pressure operated brake means for exerting braking force on a vehicle wheel, a control pipe chargeable with fluid at different pressures corresponding to a selected degree of application of the brake means, valve means controlling the supply of fluid under pressure to the fluid pressure operated brake means and the release of fluid under pressure therefrom, a movable abutment constructed and arranged to be biased in one direction by the fluid pressure in said control pipe and in the opposite direction by torque resulting from application of the brakes, for actuating said valve means to regulate the degree of application of the brakes in proportion to the pressure established in said control pipe, and changeover valve means operable to vary the effective area of said movable abutment exposed to said control pipe pressure for conditioning said brake apparatus for different classes of railway service.

7. A torque controlled brake equipment for a vehicle comprising a fluid pressure brake mechanism, torque means responsive to braking torque created by operation of said brake mechanism, biasing means, valve means controlling operation of said brake mechanism and subject to the opposing forces exerted through the medium of said torque means and said biasing means, and means for variably loading said biasing means in accordance with the different braking ratios required for the classes of service in which the vehicle is operated.

8. A torque controlled brake equipment for a vehicle comprising a fluid pressure operated brake mechanism, torque means responsive to braking torque created by operation of said brake mechanism, movable abutment means having a plurality of pressure faces adapted for selective exposure to a control fluid pressure, valve means controlling operation of said brake mechanism and subject to the opposing forces exerted by said torque means and said abutment means, and equalizing valve means responsive to a predetermined increase in fluid pressure acting on one of said pressure faces of the movable abutment means for establishing substantially the same pressure on another of said pressure surfaces.

9. A torque controlled brake equipment for a vehicle comprising a fluid pressure brake mechanism, torque means responsive to braking torque created by operation of said brake mechanism, movable abutment means subject to the pressure of fluid in a plurality of pressure chambers, valve means controlling operation of said brake mechanism and subject to opposing forces exerted by said torque means and said movable abutment means, a changeover valve device controlling a supply communication to one of said pressure chambers and adjustable to vent said chamber to the atmosphere, and an equalizing valve device operative upon a predetermined increase in the pressure of fluid supplied to another of said pressure chambers to effect equalization of the fluid pressure in said plurality of chambers regardless of the position of said changeover valve device.

10. A torque responsive brake control apparatus for controlling a fluid pressure brake mechanism, comprising a torque member constructed and arranged for movement in opposite directions by braking torque according to the direction of movement of the vehicle, a control pipe adapted to be charged with fluid under a pressure variable in accordance with the braking force desired, a pair of oppositely disposed movable abutments arranged to be subjected to the pressure of fluid in said control pipe for resisting displacement of said torque member in either direction, a pair of supply valves interposed in series relation in the communication through which fluid under pressure is supplied to said brake mechanism, a pair of release valves therefor, and actuating means carried by each of said movable abutments for operating the release and supply valves associated therewith.

11. A torque responsive brake control apparatus for controlling a fluid pressure brake mechanism, comprising a torque member constructed and arranged for movement in opposite directions by braking torque according to the direction of movement of the vehicle, a control pipe adapted to be charged with fluid under a pressure variable in accordance with the braking force desired, a pair of oppositely disposed movable abutments arranged to be subjected to the pressure of fluid in said control pipe for resisting displacement of said torque member in either direction, a pair of supply valves interposed in series relation in the communication through which fluid under pressure is supplied to said brake mechanism, a pair of release valves therefor, actuating means carrier by each of said movable abutments for operating the release and supply valves associated therewith, and changeover means adjustable for different classes of railway service to vary the effective pressure areas of both of said movable abutments.

12. A torque controlled brake equipment for a vehicle comprising a fluid pressure operated brake mechanism, torque means responsive to braking torque created by operation of said brake mechanism, biasing means, valve means controlling operation of said brake mechanism and subject to opposing forces exerted through the medium of said torque means and said biasing means, fluid pressure means for variably loading said biasing means through a plurality of pressure ranges for controlling application of the brakes, and manually controlled changeover means for selecting the pressure range according to the class of railway service desired.

13. A torque controlled brake equipment for a vehicle comprising a fluid pressure operated brake mechanism, torque means responsive to braking torque created by operation of said brake mechanism, biasing means, valve means controlling operation of said brake mechanism and subject to opposing forces exerted through the medium of said torque means and said biasing means, fluid pressure means for variably loading said biasing means through a plurality of pressure ranges for controlling application of the brakes, and inertia means responsive to the deceleration of the vehicle for automatically selecting the pressure range according to the class of railway service in which the vehicle is operated.

14. In a vehicle brake apparatus of the class including fluid pressure operated brake means, in combination, valve means for supplying and releasing fluid under pressure to and from said fluid pressure operated brake means, a control pipe adapted to be charged with fluid under a pressure variable according to the desired degree of brake application, movable abutment means responsive to an increase in said control pipe pressure to operate said valve means for supplying fluid under pressure to the brake means, torque means responsive to braking torque, and means subject to a force exerted by operation of the torque means for biasing said valve means in opposition to the fluid pressure supplied thereto through the medium of said movable abutment means.

BURTON S. AIKMAN.